(12) United States Patent
Yilmaz et al.

(10) Patent No.: US 9,497,692 B2
(45) Date of Patent: Nov. 15, 2016

(54) MEASUREMENT CONFIGURATION

(71) Applicant: Nokia Corporation, Espoo (FI)

(72) Inventors: Osman Yilmaz, Helsinki (FI); Petteri Lundén, Espoo (FI); Carl Wijting, Espoo (FI)

(73) Assignee: Nokia Technologies Oy, Espoo (FI)

( * ) Notice: Subject to any disclaimer, the term of this patent is extended or adjusted under 35 U.S.C. 154(b) by 185 days.

(21) Appl. No.: 14/288,471

(22) Filed: May 28, 2014

(65) Prior Publication Data

US 2014/0357270 A1    Dec. 4, 2014

(30) Foreign Application Priority Data

May 29, 2013  (EP) .................................... 13169647

(51) Int. Cl.
*H04W 48/16* (2009.01)
*H04W 64/00* (2009.01)
*H04W 84/04* (2009.01)

(52) U.S. Cl.
CPC ............. *H04W 48/16* (2013.01); *H04W 64/00* (2013.01); *H04W 84/045* (2013.01)

(58) Field of Classification Search
CPC . H04W 48/16; H04W 84/045; H04W 24/10; H04W 36/0061; H04W 48/20; H04W 36/04; H04W 4/22; H04W 76/007; H04W 4/008; H04M 1/72538; H04M 2250/02
See application file for complete search history.

(56) References Cited

U.S. PATENT DOCUMENTS

| 8,634,836 | B2 * | 1/2014 | Pani ..................... H04W 24/10 370/331 |
| 2009/0239533 | A1 | 9/2009 | Somasundaram et al. |
| 2010/0323633 | A1 | 12/2010 | Pani et al. |
| 2011/0243108 | A1 * | 10/2011 | Park ..................... H04W 48/16 370/336 |
| 2012/0244864 | A1 * | 9/2012 | Fujii ................. H04W 36/0066 455/436 |
| 2013/0017820 | A1 | 1/2013 | Drazynski et al. |
| 2013/0084892 | A1 * | 4/2013 | Teyeb ................... H04W 4/023 455/456.6 |
| 2014/0228020 | A1 * | 8/2014 | Subramanian ........ H04W 48/16 455/434 |

FOREIGN PATENT DOCUMENTS

WO    WO 2013020522 A1    2/2013

* cited by examiner

*Primary Examiner* — Nam Huynh
(74) *Attorney, Agent, or Firm* — Seppo Laine Oy

(57) ABSTRACT

In accordance with an example embodiment of the present invention, there is provided an apparatus, comprising: a receiver configured to receive a first message, the first message comprising an indication of a determination that a user equipment is in physical proximity of a first cell, at least one processor configured to determine whether the first cell is available to the user equipment, and the at least one processor being configured to, responsive to a determination the first cell is available to the user equipment, cause a second message to be transmitted to the user equipment, the second message comprising an instruction for the user equipment to perform at least one measurement to discover the first cell.

23 Claims, 6 Drawing Sheets

MEASUREMENT CONFIGURATION

TECHNICAL FIELD

The present application relates generally to configuring measurements in cellular networks.

BACKGROUND

Cellular communication systems are comprised of cells. Each cell in a cellular communication system may be controlled by a base station or access point device, wherein a base station may be arranged to control more than one cell, for example where cells are formed as directional sectors or where cells are configured to operate on different frequencies.

When mobile terminals roam in a coverage area of a cellular communication system, they may move from a coverage area of a first cell to a coverage area of a second cell. To maintain connectivity toward the communication system, the serving cell of such a terminal may be reassigned from the first cell to the second cell. The mobile terminal may periodically measure for signals transmitted from the first and second cells to find out, when a handover from the first cell to the second cell is useful. For example, when the mobile terminal detects that a signal strength of a signal transmitted from the first cell declines while a signal strength of a signal transmitted from the second cell increases, the terminal may conclude it is moving toward the second cell.

When a cellular communication system comprises cells operating on frequencies not very close to each other, measuring for signals transmitted from cells operating on different frequencies than the serving cell may be difficult for the mobile terminal. For example, when the second cell operates on a different carrier frequency, it may be necessary for a mobile to re-tune its radio receiver to measure a signal transmitted from the second cell. Such a measurement may be referred to as an inter-frequency measurement. In these cases, once a mobile terminal discovers a cell operating on such a different frequency, it may store data relating to the radio environment prevailing on the frequency of the originally serving cell. When the mobile terminal is again in the same place, it may determine from the stored data that the radio environment on the frequency of the serving cell is similar to what it was when previously a cell operating on a different frequency was found. The terminal may report this to a base station controlling the serving cell, responsive to which the serving cell may instruct the terminal to perform an inter-frequency measurement. Such data relating to the radio environment may be referred to as a radio fingerprint.

Heterogeneous cellular communication networks comprise cells of more than one type, for example macrocells to provide wide-area coverage, and small cells to provide high capacity in areas with high demand for network service. In heterogeneous networks, small cells may be configured to be controllable by macrocells, wherein the network may have a hierarchical structure.

SUMMARY

Various aspects of examples of the invention are set out in the claims.

According to a first aspect of the present invention, there is provided an apparatus, comprising: a receiver configured to receive a first message, the first message comprising an indication of a determination that a user equipment is in physical proximity of a first cell, at least one processor configured to determine whether the first cell is available to the user equipment, and the at least one processor being configured to, responsive to a determination the first cell is available to the user equipment, cause a second message to be transmitted to the user equipment, the second message comprising an instruction for the user equipment to perform at least one measurement to discover the first cell.

According to a second aspect of the present invention, there is provided a method, comprising receiving a first message, the first message comprising an indication of a determination that a user equipment is in physical proximity of a first cell, determining whether the first cell is available to the user equipment, and causing, responsive to a determination the first cell is available to the user equipment, a second message to be transmitted to the user equipment, the second message comprising an instruction for the user equipment to perform at least one measurement to discover the first cell.

According to a third aspect of the present invention, there is provided an apparatus, comprising a transmitter configured to cause a first message to be transmitted to a base station, the message comprising an indication of a determination that the apparatus is in physical proximity of a first cell, the first message comprising an identity of the first cell, and a receiver configured to receive from the base station a second message, the second message comprising either an instruction for the apparatus to perform at least one measurement to discover the first cell, the second message comprising an indication of a frequency at which the first cell operates, or an instruction for the apparatus to delete a fingerprint associated with the first cell.

According to a fourth aspect of the present invention, there is provided a method, comprising causing a first message to be transmitted from an apparatus to a base station, the message comprising an indication of a determination that the apparatus is in physical proximity of a first cell, the first message comprising an identity of the first cell, and receiving from the base station a second message, the second message comprising either an instruction for the apparatus to perform at least one measurement to discover the first cell, the second message comprising an indication of a frequency at which the first cell operates, or an instruction for the apparatus to delete a fingerprint associated with the first cell.

According to further aspects of the present invention, computer programs are provided that are configured to cause methods in accordance with the second and fourth aspects to be performed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

When using a fingerprint based discovery strategy, a risk is created that cell characteristics relevant to discovery change, in which case a previously defined fingerprint may become an inaccurate predictor of cell discoverability. For example, a cell may change frequency, be switched off or even change its location. If a serving cell has access to information of such changes, it may selectively react to proximity indications from mobiles by configuring measurements, not configuring measurements, or configuring modified measurements to avoid cases where unnecessary measurements would be performed by the mobiles.

Figure 1:
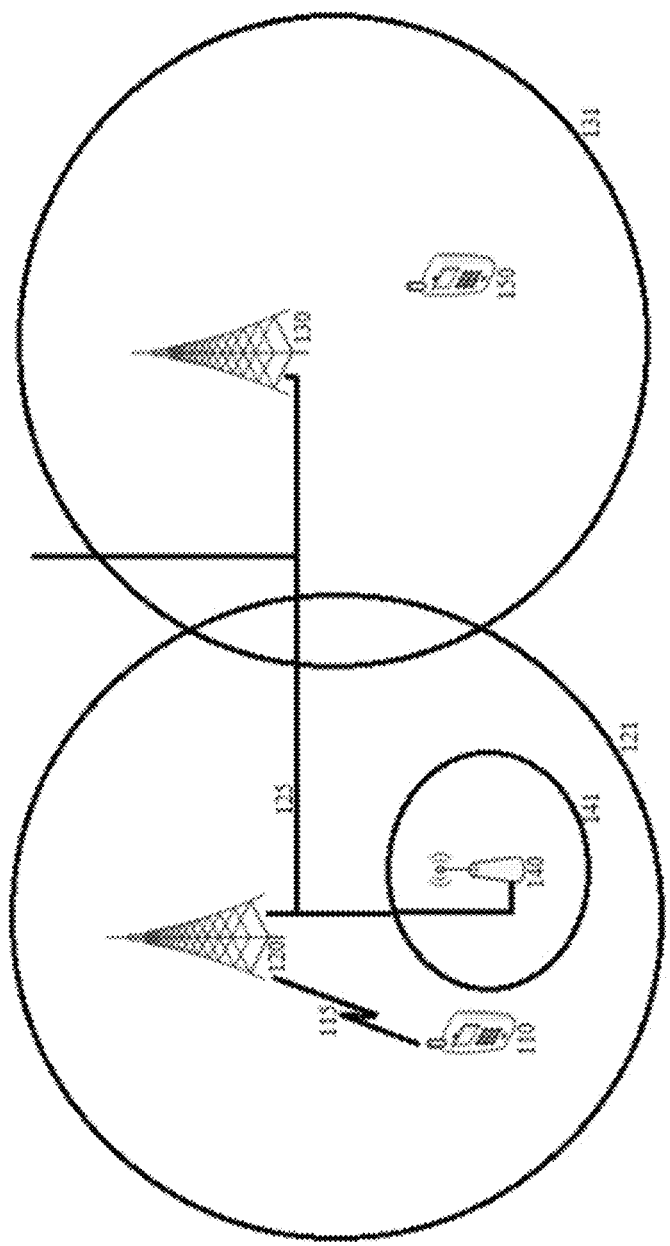
FIG. 1 illustrates an example system capable of supporting at least some embodiments of the invention.

FIG. 1 illustrates an example system capable of supporting at least some embodiments of the invention. Illustrated is mobile 110, which may comprise, for example, a user equipment, cellular telephone, laptop computer, tablet computer, personal digital assistant, PDA, wireless sensor or other mobile device with connectivity functions. An example of structure of mobile 110 is presented in FIG. 2. Illustrated is also base station 120, which is communicatively connected to mobile 110 via wireless interface 115. Base station 120 may be configured to operate in accordance with a cellular communication standard, such as for example long term evolution, LTE, or wideband code division multiple access, WCDMA.

Wireless interface 115 may operate in accordance with the same cellular communication standard as base station 120 and mobile 110, to provide interoperability between mobile 110 and base station 120. Cell 121 is controlled by base station 120. Disposed in a cell coverage area of cell 121 is cell 141, which may be seen as a small cell or femtocells, for example. Cell 141 is in turn controlled by base station 140. The term "base station" in connection with entity 140 is terminological only, and it is to be understood that in some embodiments other terms, such as for example "access point", may be seen as more usual or appropriate. In some embodiments, cell 141 is not a small cell but a macrocell like cells 121 and 131. In some embodiments, cell 121 may be a small cell, and cell 141 a macrocell or a small cell.

The illustrated communication system comprises also base station 130, which controls cell 131, and further mobile 150 which is disposed in a cell coverage area of cell 131. Cells 121 and 131 are illustrated as adjacent cells with a partial coverage area overlap, to enable seamless connectivity for mobiles roaming between the cells.

Base stations 120, 130 and 140 are illustrated as being interconnected via connections 125. Connections 125 may provide connectivity also to further entities, which are not illustrated. Such further entities may comprise, for example, at least one radio network controller, at least one core network entity and/or at least one gateway. In some embodiments, connections 125 have different arrangements than those illustrated in FIG. 1. In some embodiments, base station 140 may be connected to base station 130 instead of base station 120, for example. In some embodiments all three base stations illustrated in FIG. 1 may be connected to a connectivity node, to provide communications between the base stations.

In some embodiments, base station 140 is capable of communicating with base stations 120 and 130 via a backbone network and a core network, and not directly via connections comprised in a radio access network. In these embodiments base station 140 may be seen as distinct from the radio access network in which base stations 120 and 130 are comprised, but capable of communicating with them via the Internet, for example.

Mobile 110 is illustrated as being within the cell coverage area of cell 121, and relatively close to the cell coverage area of cell 141. Therefore, it is plausible that mobile 110 may be able to detect cell 141 by measuring for energy transmitted from base station 140. The energy measured may be energy transmitted as a beacon transmission, for example. A beacon transmission may comprise encoded therein an identity of cell 141, for example.

Assuming cell 141 operates on a different frequency than cell 121, mobile 110 being attached to cell 121 would need to perform an inter-frequency measurement to discover cell 141. Mobile 110 might have to re-tune its receiver to perform the inter-frequency measurement. To perform an inter-frequency measurement, mobile 110 may be configured by base station 120 to perform one, for example. Once mobile 110 discovers cell 141 for the first time, mobile 110 may store in a memory internal to mobile 110 a fingerprint of the location where it was when it detected cell 141. Such a fingerprint, or more generally data relating to the radio environment, may comprise, for example, information on signal strengths of beacon transmissions of base station 120 and base station 130, which may both be obtainable by mobile 110 at the frequency range where cell 121 operates, in other words without inter-frequency measurements. Thus mobile 110 may later on determine that the radio environment as seen at a frequency range where cell 121 operates is similar to what it was earlier when cell 141 was detected. Such a determination may trigger a proximity indication to be transmitted to base station 120, which may then in turn instruct mobile 110 to perform an inter-frequency measurement to once more find cell 141. In this way, mobile 110 may re-discover cell 141 using the radio environment as a clue as to when to perform an inter-frequency measurement. In some embodiments, instead of or in addition to beacon transmissions of base stations, a geolocation such as a global positioning system, GPS, or indoor positioning system, geolocation is used as the clue or fingerprint. Furthermore, in some embodiments mobile 110 may be, manually by the user or via a mobile application, triggered to transmit a proximity indication to base station 120, which may in turn instruct mobile 110 to perform an inter-frequency measurement to once more find cell 141 even though any fingerprint or geo-location information has not been stored in mobile 110.

A challenge to the fingerprint-based method for locating cells operating on frequencies different from the frequency used in the serving cell is a case where availability of the cell changes. For example, in terms of FIG. 1 if cell 141 changes its frequency, an inter-frequency measurement configured by base station 120 responsive to a proximity indication from mobile 110 may fail to locate cell 141, if the measurement is performed on the old frequency of cell 141 and not the new one. In some cases, cell 141 may be switched off in which case it cannot be discovered by any measurements mobile 110 may perform. In some cases, base station 140 may be movable, and in case base station 140 is moved to a substantially different location the fingerprint defined in connection with its previous location is no longer useful in discovering it. In fact, the fingerprint would likely trigger a futile inter-frequency measurement in the location where cell 141 used to be.

To address such challenges, base station 120 may be configured to maintain information on cell 141, or at least be capable of accessing information on cell 141. Base station 120 may maintain the information in a memory internal to base station 120, or base station may be configured to obtain the information from a separate node, which may be base station 140, for example. The information may comprise, for example, a current location of cell 141, a currently used frequency of cell 141, and information on whether cell 141 is switched on and not too highly loaded at the moment. When the information is stored externally to base station 120, base station 120 may be configured to access the information responsive to receiving a proximity indication relating to cell 141, for example.

Responsive to receiving a proximity indication from mobile 110, wherein the proximity indication may comprise an identity of cell 141, base station 120 may be configured to check the availability of cell 141. This may comprise comparing the location of cell 141 to the present location of mobile 110, wherein base station 120 may obtain the current location of mobile 110 from location services available to the cellular communication network. In some embodiments, for example when mobile 110 is triggered by its location to send the proximity indication, mobile 110 is configured to include its location in the proximity indication. Base station 120 may be configured to compare this location to a current location of cell 141 to determine whether mobile 110 is sufficiently close to cell 141. In some embodiments, the proximity indication may comprise a location of mobile 110 without comprising an identity of cell 141. In these embodiments, base station 120 may determine whether there is any inter-frequency cell available for mobile 110 near the location comprised in the proximity indication.

Responsive to a determination mobile 110 is likely to be able to access cell 141 from its present location, base station 120 may be configured to instruct mobile 110 to perform an inter-frequency measurement to locate cell 141. The instruction base station 120 in this case sends to mobile 110 may comprise an indication of the frequency cell 141 currently uses, to help mobile 110 measure the correct frequency. Thus, in case mobile 110 has included a previous frequency of cell 141 in the proximity indication and the frequency has changed, base station 120 may thus indicate a different, up-to-date frequency to mobile 110. In some embodiments, the proximity indication doesn't comprise a frequency.

Responsive to a determination mobile 110 is likely unable to access cell 141 from its present location, base station 120 may be configured to refrain from instructing mobile 110 to perform an inter-frequency measurement to locate cell 141. Since finding cell 141 would be unlikely the measurement would be unnecessary, and since performing inter-frequency measurements may incur discontinuity to communication with the service cell, in the example of FIG. 1 cell 121, the unnecessary measurement should be avoided. In some embodiments base station 120 is configured to advise mobile 110 that the fingerprint associated with cell 141 is likely to no longer be useful and/or should be deleted. This may be done when cell 141 has ceased to exist or has moved to an entirely new location, for example. In contrast, if the reason mobile 110 would be unlikely to access cell 141 is merely that cell 141 is experiencing high load, base station 120 may be configured to refrain from instructing mobile 110 to perform the inter-frequency measurement but not to instruct mobile 110 to delete the fingerprint. In the future cell 141 may be less loaded and thus available, and still discoverable using the old fingerprint as a trigger for an inter-frequency measurement. Another reason for only refraining from instructing to perform the measurement, but not instructing mobile 110 to delete the fingerprint, is if cell 141 is temporarily switched off or undergoing maintenance.

A benefit associated with deleting obsolete fingerprints from mobile 110 is that obsolete fingerprints may cause mobile 110 to transmit proximity indications relating to cells that mobile 110 likely cannot access from the location defined by such fingerprints. Therefore removing obsolete fingerprints avoids transmissions of futile proximity indications. Futile proximity indications would consume battery resources at mobile 110, increase interference in the cellular communication system and also consume some computing resources on the base station side.

In general there is provided a first apparatus, such as for example a base station or a control device for inclusion in a base station, to control the functioning thereof. Examples of possible control devices include processors and chipsets. The first apparatus may comprise a receiver configured to receive a first message, the first message comprising an indication of a determination that a user equipment is in physical proximity of a first cell. For example, the indication may be a proximity indication transmitted from a user equipment, such as mobile 110, responsive to a determination that a previously stored fingerprint matches the current whereabouts of the user equipment. The first message may be received in the first apparatus from the user equipment over an air interface, wherein the receiver may comprise a radio receiver of the first apparatus. In embodiments where the first apparatus is a control device, the receiver may comprise a receiver of the control device, which is enabled to receive information from a radio receiver of a base station in which the control device is implanted, via electrical leads internal to the base station.

The first apparatus may comprise at least one processor, such as for example at least one processing core, configured to determine whether the first cell is available to the user equipment. Such determining may comprise, for example, whether the first apparatus can determine at least one reason the first cell would not be available to the user equipment, and in the absence of such reasons the determining would comprise determining the first cell is available to the user equipment. Reasons the first cell would not be available to the user equipment may comprise, as described above, high load in the first cell, the first cell being switched off or non-existent, or the first cell being in a different location than the user equipment, for example. A further example is where a subscription associated with the user equipment is not in an allowed users list of the first cell.

The at least one processor may be further configured to, responsive to a determination the first cell is available to the user equipment, cause a second message to be transmitted to the user equipment, the second message comprising an instruction for the user equipment to perform at least one measurement to discover the first cell. The instruction may comprise a measurement configuration, for example. The measurement may comprise an inter-frequency measurement. An inter-frequency measurement may comprise a measurement on a frequency different from a frequency used in communication between the first apparatus, or a base station comprising the first apparatus, and the user equipment. A measurement configuration may comprise at least one of a set of at least one measurement gap during which a mobile may perform an inter-frequency measurement and an inter-frequency measurement periodicity.

In some embodiments, the second message comprises an indication of a frequency at which the first cell operates. This may be useful in if the frequency has changed since the last time the user equipment accessed the cell. In some embodiments, the instruction to perform at least on measurement comprises an instruction to perform measurements at a periodicity. The periodicity may depend on the determination whether the first cell is available, for example when the first cell is determined to be available the measurements may be configured as being more frequent, and when the first cell is determined to not be available the measurements may be configured as being less frequent. In some embodiments, the less frequent measurements are in fact configured to never be performed, in this sense the periodicity, or period between individual measurements, would be effectively infinite.

In some embodiments, the first message comprises an identity of the first cell, such as for example a cell physical identity, cell global identity, closed subscriber group identity or any other cell identifier or address, such as for example a medium access control, MAC, address. In some embodiments, the first cell comprises at least one of a closed subscriber group cell, a small cell, a microcell, a picocell and a femtocell. In other embodiments the first cell is a macro cell. In some embodiments, the first cell is comprised in a heterogeneous network. In some of these embodiments, a cell controlled by the first apparatus, or by a base station comprising the first apparatus, may be configured to at least in part control the first cell. The first apparatus may obtain information on the availability of the first cell using a same control connection of the heterogeneous network as the first apparatus uses for at least in part controlling the first cell.

In some embodiments, the first apparatus is configured to receive from the first cell an update message comprising information on the first cell, such as for example an indication that the first cell has changed the frequency the first cell uses, the update message comprising an indication of the new frequency. Other information on the first cell the update message may comprise includes at least one of a location of the first cell, whether the first cell is switched on, whether the first cell is too highly loaded to accept new user equipments, whether the first cell is available and information on subscriber identities allowed to access the first cell.

In some embodiments, the first apparatus is configured to, responsive to a determination the user equipment is too distant to access the first cell, that the first cell is unavailable, or that a subscription associated with the user equipment is not allowed to access the first cell, suppress the sending of the second message.

In general there is provided a second apparatus, such as for example a mobile 110 or a control device for controlling the functioning of mobile 110. The second apparatus comprises a transmitter configured to cause a first message to be transmitted to a base station, the message comprising an indication of a determination that the second apparatus is in physical proximity of a first cell, the first message comprising an identity of the first cell and/or a location of the second apparatus. When the second apparatus is a mobile 110, the transmitter may comprise a radio transmitter of mobile 110. When the second apparatus is a control device, the transmitter may comprise an output port of the control device, which may be enabled, when the control device is implanted in mobile 110, to cause a radio transmitter of mobile 110 to transmit a radio message by signaling from the output port of the control device to the radio transmitter of mobile 110 using electrical leads internal to mobile 110. The determination that the second apparatus is in physical proximity of a first cell may be based on a fingerprint stored in or accessible to the second apparatus. The determination may be incorrect in case the first cell is no longer active in the whereabouts of the fingerprint, which does not prevent the indication of the determination from being sent from the second apparatus.

The second apparatus further comprises a receiver configured to receive from the base station a second message, the second message comprising either an instruction for the apparatus to perform at least one measurement to discover the first cell, the second message comprising an indication of a frequency at which the first cell operates, or an instruction for the apparatus to delete a fingerprint associated with the first cell. Like the transmitter, the receiver may be either a radio element of mobile 110, or a communications port in a control device, depending on the embodiment.

Figure 3:
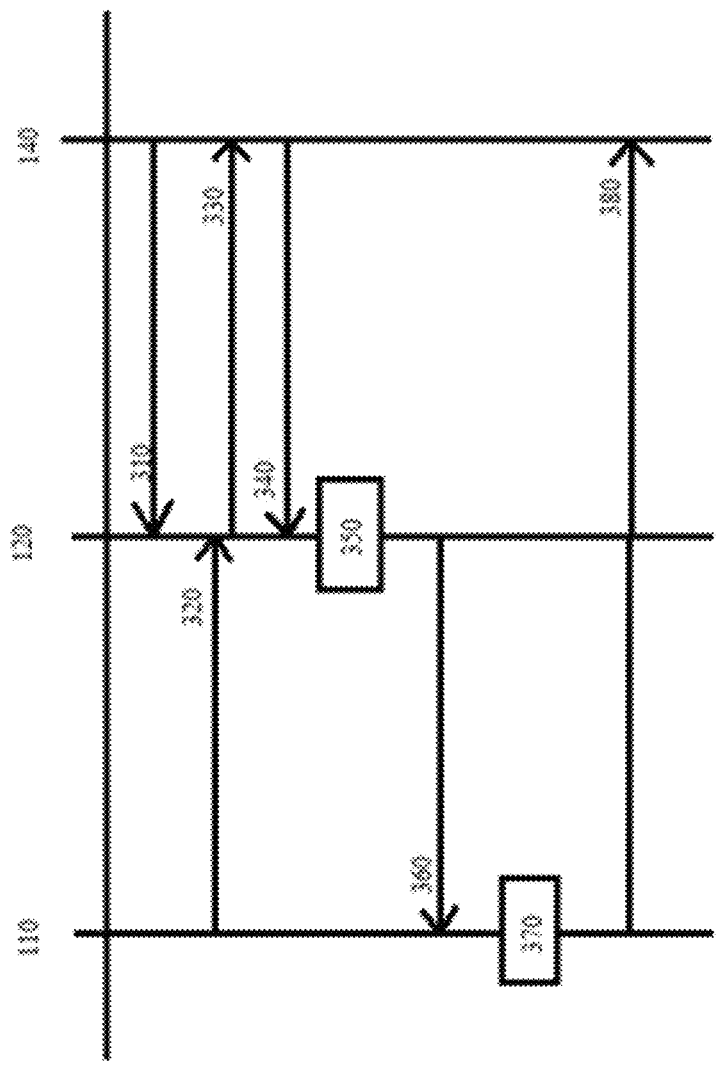
FIG. 3 is a signaling diagram illustrating signaling in accordance with at least some embodiments of the invention.

FIG. 3 is a signaling diagram illustrating signaling in accordance with at least some embodiments of the invention. On the vertical axes are illustrated, in terms of FIG. 1, mobile 110, base station 120 and base station 140. Time advances from top to bottom.

In optional phase 310, base station 140 may provide to base station 120 information on cell 141, controlled by base station 140. This information may comprise, for example, availability, frequency, load status, location and/or allowed user information as described above. In phase 320, mobile 110 transmits an indication that mobile 110 has determined it is in the physical proximity of cell 141. The determination may be based at least in part on a fingerprint stored in mobile 110, for example. The message of phase 320 may comprise an identity of cell 141. The following phases 330 and 340 may be absent in case phase 310 was present. In phase 330 base station 120 requests from base station 140 information on cell 141, and in phase 340 base station 140 responsively provides this information, which may be essentially similar to information described above in connection with phase 310. If base station 120 was furnished with this information in phase 310, it may be available to base station 120 in an internal memory of base station 120, rendering unnecessary the requesting of the information from base station 140. On the other hand, in some embodiments base station 120 may be configured to, responsive to message 320, request updated information on cell 141 in case the information base station 120 has on cell 141 is older than a threshold age, which threshold age may be configured in base station 120.

Phase 350 comprises that base station 120 determines, whether cell 141 is available to mobile 110. As described above, this determination may comprise determining if base station 120 is aware of at least one reason rendering cell 141 unavailable to mobile 110. Reasons rendering cell 141 unavailable to mobile 110 may comprise, for example, that a subscriber identity associated with mobile 110 is not on a list of allowed subscribers of cell 141, cell 141 is switched off, cell 141 is too highly loaded and cell 141 being in a location that is too distant from mobile 110.

In case the determination of phase 350 concludes mobile 110 cannot access cell 141, base station 360 may in phase 360 advise or request mobile 110 to delete the fingerprint that triggered the message of phase 320 to be sent. In this case, phases 370 and 380 are absent. In some embodiments, base station 120 is configured to not reply to mobile 110 in any way in case the determination of phase 350 concludes mobile 110 cannot access cell 141. In this case, phases 360, 370 and 380 are absent.

If on the other hand the determination is that base station 120 isn't aware of reasons why cell 141 would be unavailable to mobile 110, base station 120 may in phase 360 instruct mobile 110 to perform a measurement, for example an inter-frequency measurement, to discover cell 141. The instruction message of phase 360 may in this case comprise an indication as to which frequency cell 141 uses. Responsively, in phase 370, mobile 110 may be configured to perform the measurement, and in case cell 141 is found, transmit a message to base station 140, which is illustrated as phase 380. The message of phase 380 may request association with cell 141, for example.

Figure 4:
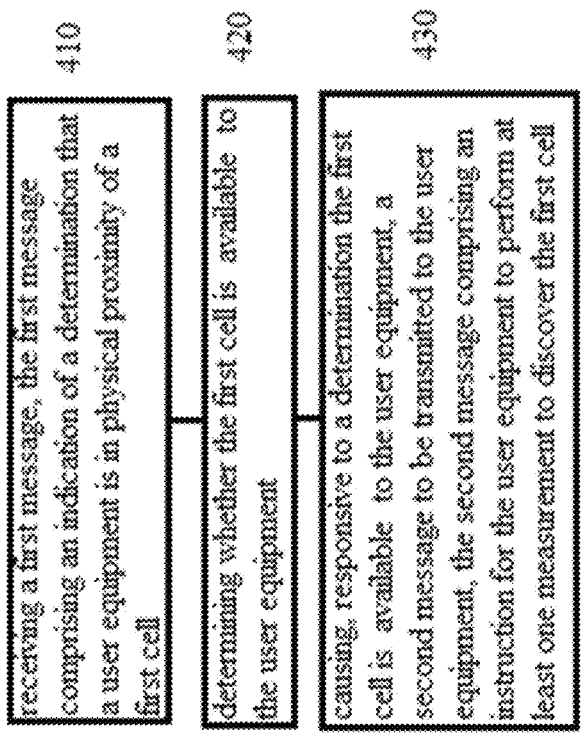
FIG. 4 is a first flow diagram illustrating a method in accordance with at least some embodiments of the invention.

FIG. 4 is a first flow diagram illustrating a method in accordance with at least some embodiments of the invention. The phases illustrated in FIG. 4 may be performed in base station 120, for example. Phase 410 comprises receiving a first message, the first message comprising an indication of a determination that a user equipment is in physical proximity of a first cell. Phase 420 comprises determining whether the first cell is available to the user equipment. Finally, phase 430 comprises causing, responsive to a determination the first cell is available to the user equipment, a second message to be transmitted to the user equipment, the second message comprising an instruction for the user equipment to perform at least one measurement to discover the first cell.

Figure 2:
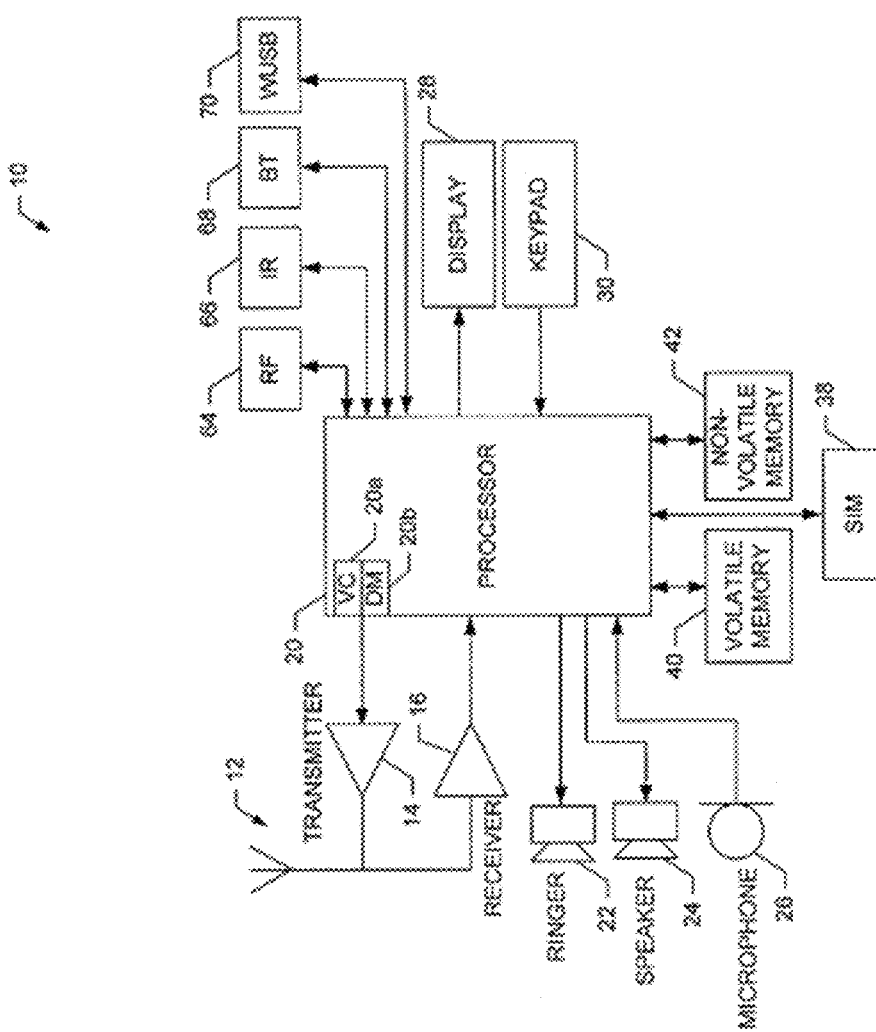
FIG. 2 illustrates a block diagram of an apparatus in accordance with an example embodiment of the invention.
Figure 5:
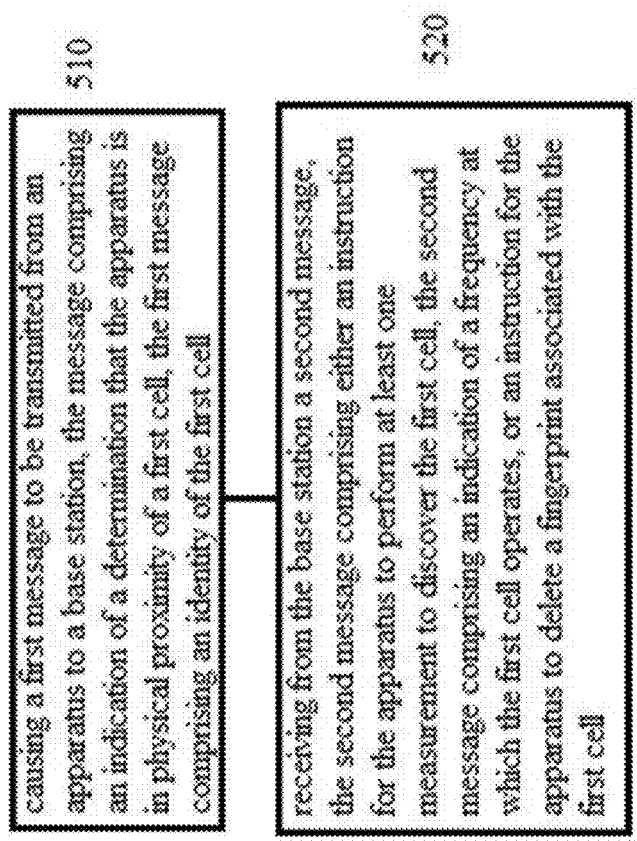
FIG. 5 is a second flow diagram illustrating a method in accordance with at least some embodiments of the invention.

FIG. 5 is a second flow diagram illustrating a method in accordance with at least some embodiments of the invention. The phases illustrated in FIG. 5 may be performed in mobile 110, for example. Phase 510 comprises causing a first message to be transmitted from an apparatus to a base station, the message comprising an indication of a determination that the apparatus is in physical proximity of a first cell, the first message comprising an identity of the first cell. Phase 520 comprises receiving from the base station a second message, the second message comprising either an instruction for the apparatus to perform at least one measurement to discover the first cell, the second message comprising an indication of a frequency at which the first cell operates, or an instruction for the apparatus to delete a fingerprint associated with the first cell FIG. 2 illustrates a block diagram of an apparatus 10 such as, for example, a mobile terminal, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. A processor comprising exactly one processing core may be referred to as a single-core processor, while a processor comprising more than one processing core may be referred to as a multi-core processor. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analogue or TDMA/CDMA/analogue phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analogue-to-digital converter, a digital-to-analogue converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory available to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Bluetooth low energy, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

While FIG. 2 is described above primarily in the context of a mobile device, certain of the components discussed, such as memories, processors and transceivers, can be employed to implement a network-side device.

Figure 6:
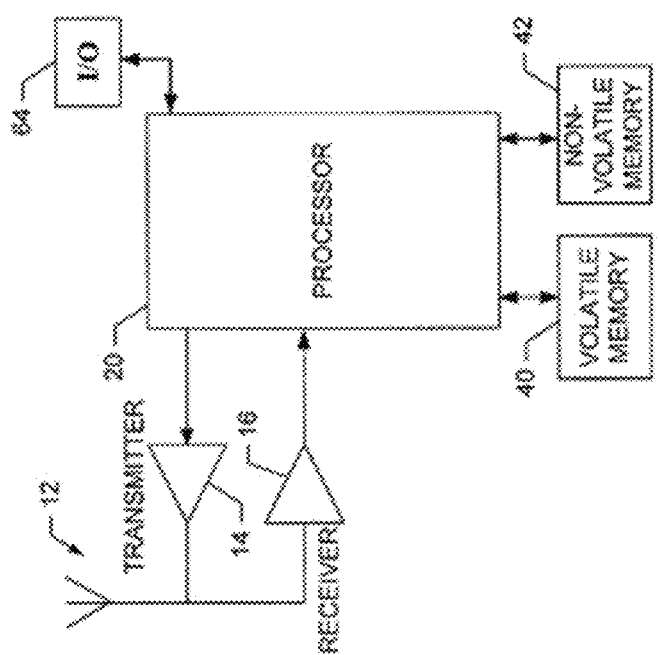
FIG. 6 illustrates a block diagram of an apparatus in accordance with an example embodiment of the invention

FIG. 6 illustrates a block diagram of an apparatus 10 such as, for example, a base station, in accordance with an example embodiment of the invention.

As shown, the apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. A processor comprising exactly one processing core may be referred to as a single-core processor, while a processor comprising more than one processing core may be referred to as a multi-core processor. Accordingly, although illustrated in FIG. 4 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be developed in the future. The apparatus may comprise a wired interface I/O 64, which may be configured to enable the apparatus to communicate with other apparatuses, which may include base stations, radio access network controllers and core network entities.

The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal.

Without in any way limiting the scope, interpretation, or application of the claims appearing below, a technical effect of one or more of the example embodiments disclosed herein is that unnecessary inter-frequency measurements may be avoided. Another technical effect of one or more of the example embodiments disclosed herein is that interference in a cellular communication system may be decreased. Another technical effect of one or more of the example embodiments disclosed herein is that management of fingerprints on mobile terminals is enhanced.

Embodiments of the present invention may be implemented in software, hardware, application logic or a combination of software, hardware and application logic. The software, application logic and/or hardware may reside on memory 40, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a receiver configured to receive a first message, the first message comprising an indication of a determination that a user equipment is in physical proximity of a first cell, the first message not comprising a measurement on a frequency the first cell is using;
at least one processor configured to:
responsive to receiving the first message, obtain a location of the first cell and a location of the user equipment, and
determine whether the first cell is in physical proximity to the user equipment based on the location of the first cell and the location of the user equipment, and
responsive to a determination the first cell is in physical proximity to the user equipment, cause a second message to be transmitted to the user equipment, the second message comprising an instruction for the user equipment to perform at least one measurement to discover the first cell, responsive to a determination that the first cell is not in physical proximity to the user equipment, suppress the sending of the second message.

2. An apparatus according to claim 1, wherein the second message comprises an indication of a frequency at which the first cell operates.

3. An apparatus according to claim 1, wherein the at least one processor is configured to cause the second message to be transmitted comprising an instruction for the user equipment to perform measurements at a first periodicity responsive to a determination that the first cell is available to the user equipment, and the at least one processor is configured to cause the second message to be transmitted comprising an instruction for the user equipment to perform measurements at a second periodicity responsive to a determination the first cell is not available to the user equipment.

4. An apparatus according to claim 3, wherein the second periodicity comprises that no measurements are instructed to be performed.

5. An apparatus according to claim 1, wherein the first message comprises at least one of an identity of the first cell and a location of the user equipment.

6. An apparatus according to claim 1, wherein the first cell is at least one of a closed subscriber group cell, a small cell, a microcell, a picocell, a macrocell and a femtocell.

7. An apparatus according to claim 1, wherein the first cell is comprised in a heterogeneous network and the apparatus is capable at least in part of controlling the first cell.

8. An apparatus according to claim 1, wherein the apparatus comprises a memory storing information on a frequency the first cell is using.

9. An apparatus according to claim 8, wherein the apparatus is further configured to receive from the first cell an update message comprising an indication that the first cell has changed the frequency the first cell uses, the update message comprising an indication of the new frequency.

10. An apparatus according to claim 1, wherein the apparatus is configured to obtain, responsive to receiving the first message, information on an availability status of the first cell, and responsive to the first cell being unavailable, suppressing the sending of the second message.

11. An apparatus according to claim 1, wherein the apparatus comprises a base station device, the apparatus further comprising an antenna coupled to the receiver and configured to provide signals to the at least one processor.

12. A method, comprising:
  receiving a first message, the first message comprising an indication of a determination that a user equipment is in physical proximity of a first, the first cell not comprising a measurement on a frequency the first cell is using;
  responsive to receiving the first message, obtaining a location of the first cell and a location of the user equipment, and
  determining whether the first cell is in physical proximity to the user equipment based on the location of the first cell and the location of the user equipment;
  causing, responsive to a determination the first cell is in physical proximity to the user equipment, a second message to be conditionally transmitted to the user equipment, the second message comprising an instruction for the user equipment to perform at least one measurement to discover the first cell, and
  suppressing, responsive to the location of the first cell being distant from a location of the user equipment, the sending of the second message.

13. A method according to claim 12, wherein the second message comprises an indication of a frequency at which the first cell operates.

14. A method according to claim 12, wherein the second message comprising an instruction for the user equipment to perform measurements at a first periodicity is caused to be transmitted responsive to a determination that the first cell is available to the user equipment, the second message comprising an instruction for the user equipment to perform measurements at a second periodicity is caused to be transmitted responsive to a determination the first cell is not available to the user equipment.

15. A method according to claim 14, wherein the second periodicity comprises that no measurements are instructed to be performed.

16. A method according to claim 12, wherein the first message comprises at least one of an identity of the first cell and a location of the user equipment.

17. A method according to claim 12, wherein the first cell is at least one of a closed subscriber group cell, a small cell, a microcell, a picocell and a femtocell.

18. A method according to claim 12, wherein the first cell is comprised in a heterogeneous network and an apparatus performing the method is capable at least in part of controlling the first cell.

19. A method according to claim 12, further comprising storing information on a frequency the first cell is using.

20. A method according to claim 19, further comprising receiving from the first cell an update message comprising an indication that the first cell has changed the frequency the first cell uses, the update message comprising an indication of the new frequency.

21. A method according to claim 12, further comprising obtaining, responsive to receiving the first message, information on an availability status of the first cell, and responsive to the first cell being unavailable, suppressing the sending of the second message.

22. A method according to claim 12, comprising performing the method in a base station device.

23. A computer program product comprising a computer-readable non-transitory medium bearing computer program code embodied therein for use with a computer, the computer program code comprising:
  code for receiving a first message, the first message comprising an indication of a determination that a user equipment is in physical proximity of a first cell, the first message not comprising a measurement on a frequency the first cell is using;
  code for obtaining, responsive to receiving the first message, a location of the first cell and a location of the user equipment;
  code for determining whether the first cell is in physical proximity to the user equipment based on the location of the first cell and the location of the user equipment;
  code for causing, responsive to a determination the first cell is in physical proximity to the user equipment, a second message to be transmitted to the user equipment, the second message comprising an instruction for the user equipment to perform at least one measurement to discover the first cell, and
  code for suppressing, responsive to the location of the first cell being distant from a location of the user equipment, the sending of the second message.

* * * * *